UNITED STATES PATENT OFFICE.

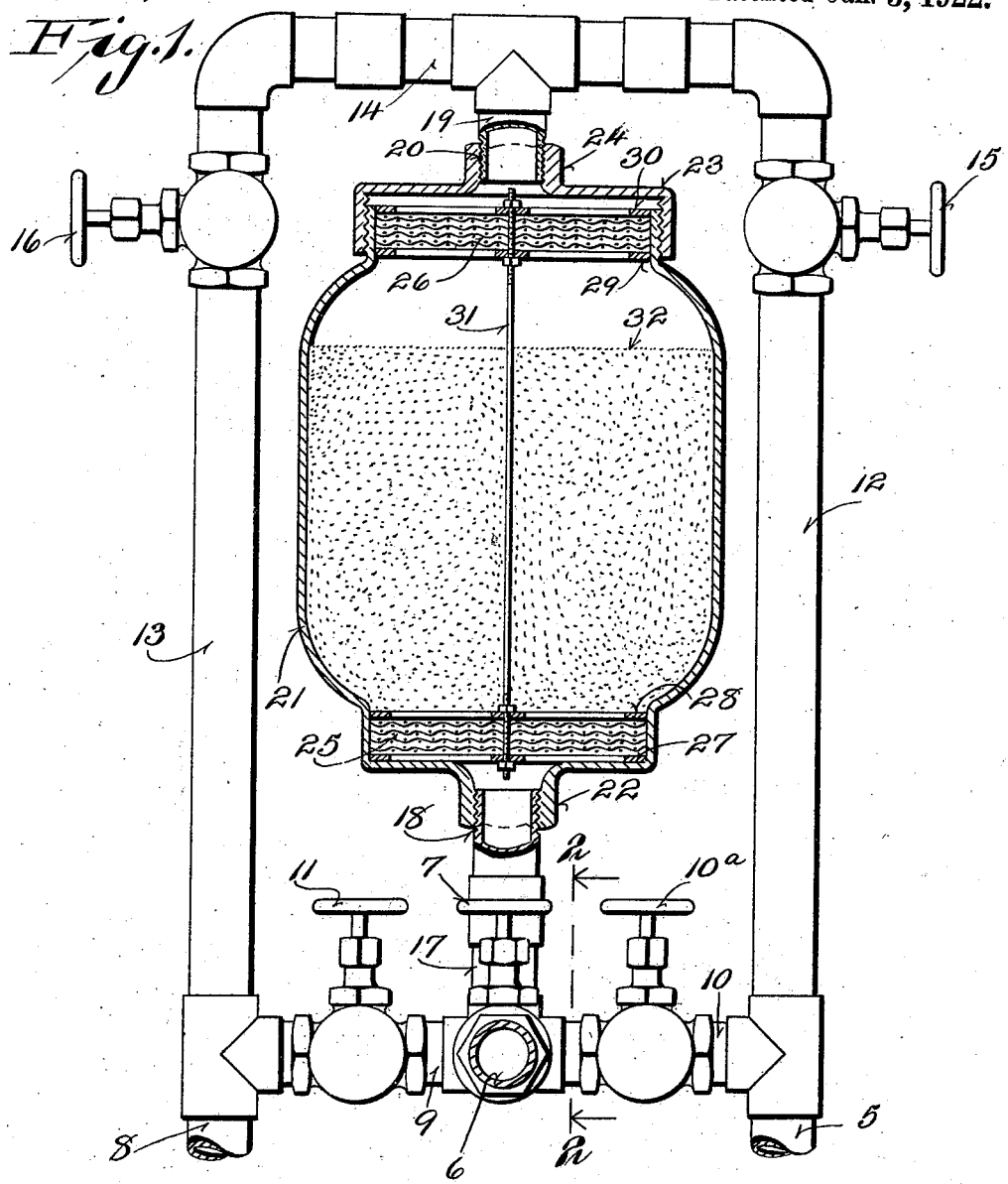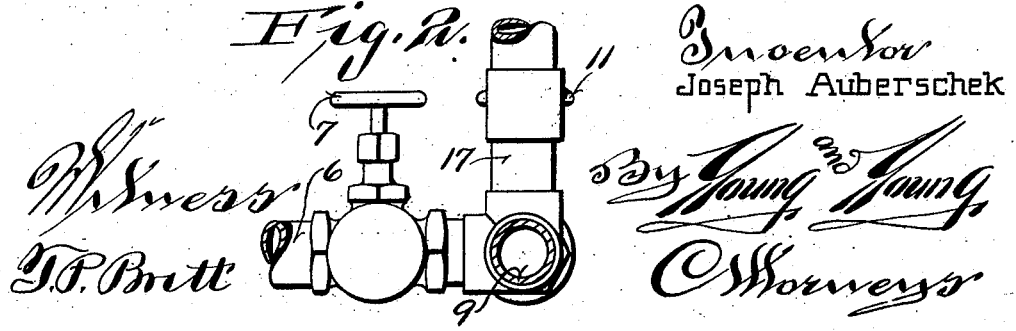

JOSEPH AUBERSCHEK, OF MILWAUKEE, WISCONSIN.

WATER FILTER.

1,402,706.

Specification of Letters Patent.

Patented Jan. 3, 1922.

Application filed February 1, 1921. Serial No. 441,557.

*To all whom it may concern:*

Be it known that I, JOSEPH AUBERSCHEK, a citizen of the United States, and resident of Milwaukee, in the county of Milwaukee and State of Wisconsin, have invented certain new and useful Improvements in Water Filters; and I do hereby declare that the following is a full, clear, and exact description thereof.

This invention relates to a water filter and more especially to one which may be automatically cleansed by reversing the direction of the current therethrough.

One of the objects of the invention is to provide a waste pipe in a position such that all sediment which is strained out by the filter when the current flows in either direction may be readily drawn off, so as to leave the drinking water, which passes through the filter, perfectly pure.

Another object is to improve the construction of the filter so that the same may be more thoroughly cleansed.

The invention consists further in details of construction, which will be described in the following specification and subsequently claimed.

Referring to the drawing, which is a part of this specification,

Figure 1 is a vertical sectional view through the filter and showing the water system connected therewith, and Figure 2 is a sectional detailed view on the line 2—2 of Figure 1.

As shown in the drawing, the water is supplied through the main supply pipe 5 and is discharged through the pipe 6 which is controlled by the valve 7. A waste pipe 8 is connected with the system for the purpose of drawing off the wash water when the filter is cleansed. A pipe 9 connects the waste pipe with the pipe leading to the lower end of the filter and this pipe is provided with a valve 11. A pipe 10 connects the supply pipe 5 with the pipe leading to the lower end of the filter and is controlled by a valve 10ª. Leading from the supply pipe and waste pipe to the upper end of the filter are pipes 12 and 13, which are connected at their upper ends by the pipe 14. Valves 15 and 16 are provided in the pipes 12 and 13 respectively. Leading to the lower end of the filter is a pipe 17 provided at its upper end with the threaded end 18 and leading downward from the pipe 14 is a nipple 19 provided with the threaded end 20 for connection with the upper end of the filter, which as shown is in the nature of a flask 21. The flask is provided with a sleeve 22 at its lower end for connection with the threaded end 18 and is provided at its upper end with a collar 23, which has the reduced portion 24 connected with the threaded end 20. A series of screens 25 is provided for the lower end of the flask and a series of screens 26 for the upper end. These screens are clamped between the spiders 27, 28, 29 and 30, which are adjustably mounted on the ends of the vertical rod 31. The flask is partly filled with sand as indicated at 32.

Normally the water is supplied through the pipe 5 and through the valve 15 to the upper end of the filter and passes out through the lower end and through the pipe 6. When it is desired to cleanse the filter, the valve 15 is closed and the valve 10ª is opened. Also the valve 16 is opened and the water passes up through the filter and is drawn off through the waste pipe 8 carrying whatever sediment and impurities have been collected at the upper end of the filter. It will also be noted that the flask is only partly filled with sand, and the water pouring in through the bottom of the filter will cause the sand to boil up in the flask and become thoroughly washed. It will be noted also that there is a limited play of the screens carried by the rod 31. This allows the screens to rise up sufficiently so that the water obtains free access to all parts of the screens 25. While the filter is being washed, the unfiltered water coming through the screens 25 will leave its sediment below the filter. When the sand and upper screens have been thoroughly cleansed, it becomes necessary, after the direction of the current through the filter has been reversed, to also draw off the sediment collected in the lower end of the filter into the waste pipe 8. To do this, the valves 10ª and 16 are closed and the valve 11 is opened. The water then passes through the pipe 12, and the valve 15 downwardly through the filter and out through the waste pipe. It will also be noted that the waste pipe is located below the lower end of the filter, so as to leave no pockets in which the sediment may collect.

I claim:

1. In a water supply system, a main supply pipe, a filter and a discharge pipe, means for normally drawing the water from the supply pipe through the filter to the discharge pipe, means for directing the water from the supply pipe through the filter in a reversed direction to wash the filter, a waste pipe through which the wash water is discharged and means for temporarily directing the water through the waste pipe when it has been again turned to its normal direction through the filter to remove any impurities which may have collected while the filter was being washed, said last named means and the waste pipe being located below the normal outlet of the filter so as to leave no pockets to collect sediment.

2. In a water supply system, a filter comprising a flask having openings in the top and bottom, a series of screens covering each opening, a vertical rod having a pair of spiders at each end between which the screens are clamped, said flask being partially filled with sand, means for directing water downwardly through the filter for purifying the same, and means for reversing the direction of flow through the filter for washing the filter.

In testimony that I claim the foregoing I have hereunto set my hand at Milwaukee, in the county of Milwaukee and State of Wisconsin.

JOSEPH AUBERSCHEK.